US012300891B2

(12) United States Patent
Onkura

(10) Patent No.: US 12,300,891 B2
(45) Date of Patent: May 13, 2025

(54) ANTENNA DEVICE, AND WIRELESS COMMUNICATION DEVICE

(71) Applicant: NEC Platforms, Ltd., Kawasaki (JP)

(72) Inventor: Yu Onkura, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 134 days.

(21) Appl. No.: 17/918,357

(22) PCT Filed: Mar. 3, 2021

(86) PCT No.: PCT/JP2021/008212

§ 371 (c)(1), (2) Date: Oct. 12, 2022

(87) PCT Pub. No.: WO2021/215121

PCT Pub. Date: Oct. 28, 2021

(65) Prior Publication Data

US 2023/0198156 A1 Jun. 22, 2023

(30) Foreign Application Priority Data

Apr. 22, 2020 (JP) ................................. 2020-075850

(51) Int. Cl.
*H01Q 19/26* (2006.01)
*H01Q 9/42* (2006.01)

(52) U.S. Cl.
CPC ............... *H01Q 19/26* (2013.01); *H01Q 9/42* (2013.01)

(58) Field of Classification Search
CPC .......... H01Q 9/42; H01Q 19/22; H01Q 19/26; H01Q 19/28
See application file for complete search history.

(56) References Cited

U.S. PATENT DOCUMENTS 9,306,275 B2 * 4/2016 Mikata ..................... H01Q 9/42
2005/0024272 A1 * 2/2005 Ponce De Leon ..... H01Q 5/378 343/702

(Continued)

FOREIGN PATENT DOCUMENTS

JP 2005-538623 A 12/2005
JP 2006-033798 A 2/2006

(Continued)

OTHER PUBLICATIONS

International Search Report for PCT Application No. PCT/JP2021/008212, mailed on May 18, 2021.

*Primary Examiner* — Dameon E Levi
*Assistant Examiner* — Leah Rosenberg
(74) *Attorney, Agent, or Firm* — Sughrue Mion, PLLC

(57) ABSTRACT

Provided are an antenna device and a wireless communication device that are small in size and capable of transmitting and receiving vertically polarized waves without requiring an additional noise countermeasure. The antenna device (100) includes: a feeding antenna element (101) having an element section (101A) parallel to a ground surface, one end of which is electrically connected to a supply source (203) supplying a wireless communication signal; and a parasitic antenna element (102) having a vertical element section disposed perpendicular to the ground surface, and being disposed near another end of the feeding antenna element (101). The wireless communication device (200) includes: a substrate (201) on which a ground layer (202) having a reference potential and a supply source (203) supplying a wireless communication signal are formed; and the antenna device (100).

2 Claims, 11 Drawing Sheets

(56) References Cited

U.S. PATENT DOCUMENTS

| | | | | |
|---|---|---|---|---|
| 2005/0275596 | A1* | 12/2005 | Harano | H01Q 9/42 343/702 |
| 2008/0150810 | A1* | 6/2008 | Sugiyama | H01Q 9/40 343/702 |
| 2011/0122040 | A1* | 5/2011 | Wakabayashi | H01Q 9/16 343/833 |
| 2011/0298669 | A1* | 12/2011 | Rao | H01Q 1/243 343/893 |
| 2012/0050129 | A1* | 3/2012 | Kanazawa | H01Q 1/521 343/848 |
| 2013/0271339 | A1* | 10/2013 | Mikata | H01Q 21/28 343/850 |
| 2019/0044239 | A1* | 2/2019 | Sonoda | H01Q 9/30 |
| 2020/0274251 | A1* | 8/2020 | Sakamoto | H01Q 1/48 |
| 2022/0368006 | A1* | 11/2022 | Tsuchiya | H01Q 9/30 |
| 2022/0368035 | A1* | 11/2022 | Kanasaki | H01Q 9/42 |

FOREIGN PATENT DOCUMENTS

| | | | |
|---|---|---|---|
| JP | 2008-160314 | A | 7/2008 |
| JP | 2017-028392 | A | 2/2017 |
| JP | 2018-170590 | A | 11/2018 |
| JP | 6679120 | B1 | 4/2020 |
| WO | 2015/108133 | A1 | 7/2015 |
| WO | 2018/180877 | A1 | 10/2018 |

* cited by examiner

VERTICALLY POLARIZED WAVE -9.1dBi
ANTENNA EFFICIENCY -3.4dB

VERTICALLY POLARIZED WAVE -1.5dBi
ANTENNA EFFICIENCY -1.6dB

VERTICALLY POLARIZED WAVE -1.7dBi
ANTENNA EFFICIENCY -1.5dB

VERTICALLY POLARIZED WAVE -5.0dBi
ANTENNA EFFICIENCY -2.9dB

ANTENNA DEVICE, AND WIRELESS COMMUNICATION DEVICE

This application is a National Stage Entry of PCT/JP2021/008212 filed on Mar. 3, 2021, which claims priority from Japanese Patent Application 2020-075850 filed on Apr. 22, 2020, the contents of all of which are incorporated herein by reference, in their entirety.

TECHNICAL FIELD

The present invention relates to an antenna device and a wireless communication device.

BACKGROUND ART

When transmission and reception of radio waves are performed between wireless communication devices, it is necessary to match polarized waves of antennas with each other. When an opposite wireless communication device transmits and receives only a vertically polarized wave, an own wireless communication device needs to be capable of transmitting and receiving the vertically polarized wave as well. For example, when communicating with an access point having a dipole antenna disposed perpendicularly to a ground surface, an antenna of a slave unit also needs to be capable of transmitting and receiving a vertically polarized wave. In order to transmit and receive a vertically polarized wave, it is necessary to mount an antenna element having a portion perpendicular to the ground surface. In addition, as a frequency of radio waves to be transmitted and received becomes lower (a wavelength thereof becomes longer), it is necessary to increase a length of a portion of the antenna element that is perpendicular to the ground surface. Namely, it is necessary to increase a height of the wireless communication device. However, when the height of the wireless communication device is increased, an installation location of the wireless communication device is limited. In addition, when the portion of the antenna element that is perpendicular to the ground surface is shortened in order to reduce the height of the wireless communication device, a communicable distance is shortened.

Patent Literature 1 describes an antenna device including a plate-shaped ground plate that provides a ground potential, an inverted L-shaped feeding element connected to the ground plate via a feeding unit, and a linear parasitic element disposed at a predetermined interval from the ground plate in such a way as to be capacitively coupled to the ground plate. In Patent Literature 1, the linear parasitic element is connected to an inductor having a length less than one half of a wavelength of a radio wave to be transmitted and received and providing a predetermined inductance. In Patent Literature 1, the inductance provided by the inductor is set to a value at which the inductance resonates in series with a capacitance formed between the ground plate and the feeding element. As a result, a current whose phase is shifted by 90 degrees from a current flowing through the feeding element is excited in the parasitic element. Therefore, a length of the parasitic element as a reflection element can be shortened to less than one half of the wavelength of the radio wave to be transmitted and received.

Patent Literature 2 describes a radio including a first antenna connected to a conductor plate being a ground conductor via a feeding unit, and a second antenna being connected to the conductor plate via a connecting unit and a terminal and including an element disposed in parallel with the first antenna. Further, in Patent Literature 2, a high-frequency characteristic of the radio is improved by adjusting an interval between the first antenna and the element of the second antenna. Patent Literature 2 describes that the second antenna is miniaturized by bending a portion extending from the element of the second antenna in a direction away from the radio.

CITATION LIST

Patent Literature

[Patent Literature 1] Japanese Unexamined Patent Application Publication No. 2018-170590

[Patent Literature 2] Japanese Unexamined Patent Application Publication No. 2017-028392

SUMMARY OF INVENTION

Technical Problem

However, in Patent Literature 1, a current flowing through the ground plate is used, and the feeding element and the parasitic element are disposed at separate positions. It is necessary to perform design for suppressing noise on a periphery of an antenna such as the feeding element and the parasitic element. Therefore, when the feeding element and the parasitic element are disposed at separate positions, an additional noise countermeasure is required.

Further, Patent Literature 2 does not mention a technique for matching polarized waves of antennas between wireless communication devices with each other.

An object of the present invention is to provide an antenna device and a wireless communication device that are small in size and capable of transmitting and receiving a vertically polarized wave without requiring an additional noise countermeasure.

Solution to Problem

An antenna device according to a first aspect of the present invention includes: a feeding antenna element that is electrically connected at one end to a supply source supplying a wireless communication signal and that is provided with an element section parallel to a ground surface; and a parasitic antenna element that is provided with a vertical element section disposed perpendicularly to the ground surface and that is disposed near another end of the feeding antenna element.

A wireless communication device according to a second aspect of the present invention includes: a substrate on which a ground layer having a reference potential and a supply source supplying a wireless communication signal are formed; and the antenna device described above.

Advantageous Effects of Invention

It is possible to provide an antenna device and a wireless communication device that are small in size and capable of transmitting and receiving a vertically polarized wave without requiring an additional noise countermeasure.

EXAMPLE EMBODIMENT

Example embodiments of the present invention will be explained below with reference to the drawings.

First Example Embodiment

Figure 1:
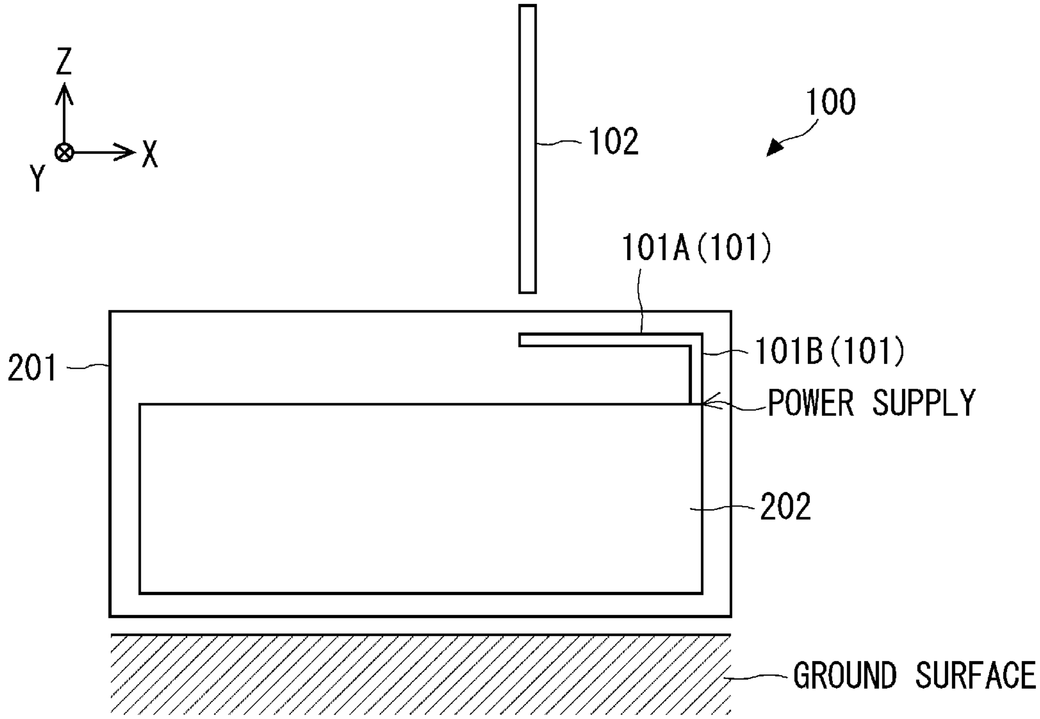
FIG. 1 is a front view illustrating an example of an antenna device according to a first example embodiment of the present invention.
Figure 2:
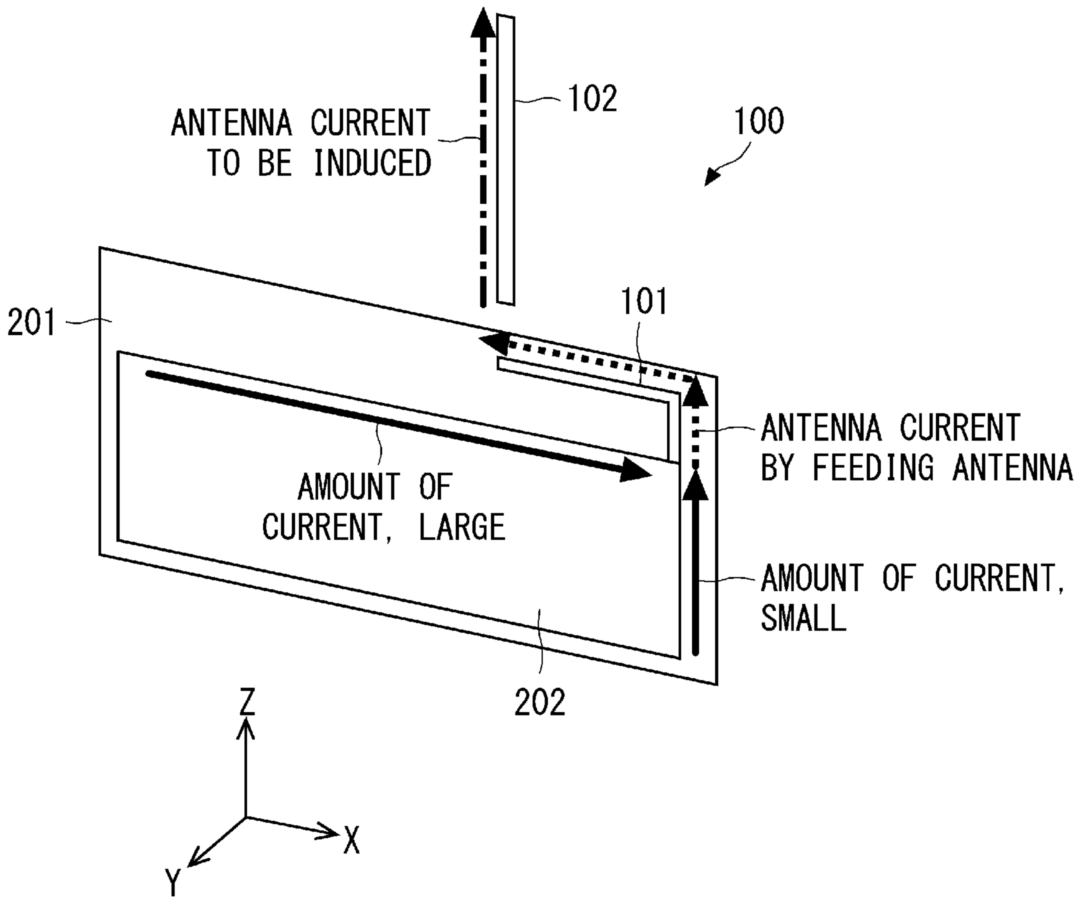
FIG. 2 is a perspective view illustrating an example of the antenna device according to the first example embodiment of the present invention.
Figure 3:
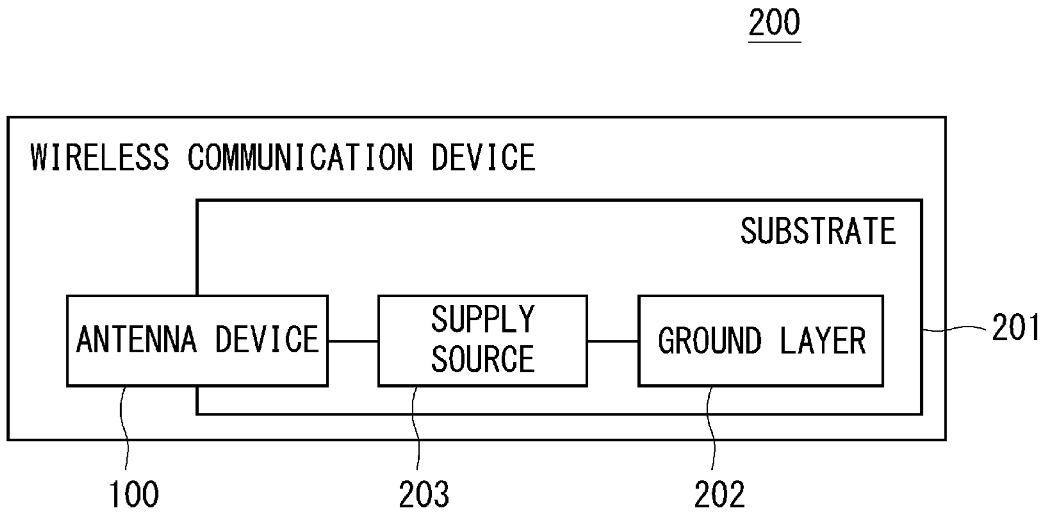
FIG. 3 is a block diagram illustrating an example of a configuration of a wireless communication device according to the first example embodiment of the present invention.

First, a first example embodiment of the present invention will be explained with reference to FIGS. 1 to 5. FIGS. 1 and 2 are diagrams each illustrating an example of an antenna device 100 according to the first example embodiment of the present invention. FIG. 3 is a block diagram illustrating an example of a configuration of a wireless communication device 200 including the antenna device 100. In this specification, an axis perpendicular to a ground surface is defined as a Z axis, an axis orthogonal to the Z axis and parallel to a substrate 201 (to be described later) is defined as an X axis, and an axis orthogonal to the Z axis and perpendicular to the substrate 201 is defined as a Y axis. Namely, the X-axis and the Y-axis are axes parallel to the ground surface.

As illustrated in FIGS. 1 and 2, the antenna device 100 includes a feeding antenna element 101 and a parasitic antenna element 102. The antenna device 100 performs transmission and reception of a target radio wave. Examples of the target radio wave by the antenna device 100 include microwave (SHF: Super High Frequency), ultra-high frequency wave (UHF: Ultra High Frequency), and the like. A wavelength of the microwave is about 10 mm to 100 mm, and a wavelength of the ultra-high frequency wave is about 100 mm to 1000 mm.

The feeding antenna element 101 is provided on a substrate 201 on which a ground layer 202 having a reference potential and a supply source 203 supplying a radio communication signal (refer to FIG. 3) are formed. The feeding antenna element 101 includes an element section 101A parallel to the ground surface. Namely, the element section 101A is disposed in parallel with the X-axis. The feeding antenna element 101 is provided on an edge side of the substrate 201 on a side opposite to the ground surface side in such a way that the element section 101A extends along the edge. One end of the feeding antenna element 101 is electrically connected to the supply source 203. Hereinafter, the end of the feeding antenna element 101 connected to the supply source 203 will be referred to as a feeding end. The feeding antenna element 101 is formed of a linear or elongated plate-like electrical conductor such as copper, brass, or aluminum. The feeding antenna element 101 may be formed as a conductor pattern of the substrate 201.

Specifically, as illustrated in FIGS. 1 and 2, the feeding antenna element 101 is, for example, an inverted L-shaped element in which an element section 101A and an element section 101B are vertically connected. One element section 101A constituting the L-shape is disposed in such a way as to be parallel to the ground surface. In other words, the element section 101A is disposed in parallel with the X-axis. Another element section 101B constituting the L-shape is disposed in such a way as to be perpendicular to the ground surface, in other words, the element section 101B is disposed in parallel with the Z-axis. Another end (a feeding end) of the element section 101B, which is not connected to the element section 101A, is connected to the supply source 203.

The parasitic antenna element 102 includes a vertical element section disposed perpendicularly to the ground surface. As illustrated in FIGS. 1 and 2, the parasitic antenna element 102 according to the first example embodiment includes only a vertical element section. In other words, the parasitic antenna element 102 is disposed in parallel with the Z-axis. Furthermore, the parasitic antenna element 102 is disposed in the vicinity of another end of the feeding antenna element 101 (an end on a side opposite to the feeding end). More specifically, an end of the parasitic antenna element 102 on the feeding antenna element 101 side is disposed apart from an edge of the substrate 201 by a predetermined distance. The end of the parasitic antenna element 102 is disposed in the vicinity of the end of the parasitic antenna element 101 on the side opposite to the end of the element section 101A connected to the element section 101B. Note that a distance between the end of the parasitic antenna element 102 and the another end of the feeding antenna element 101 (end on the side opposite to the feeding end) is a distance at which a high-frequency current can be excited in the parasitic antenna element 102 by feeding the feeding antenna element 101.

The parasitic antenna element 102 is formed of a linear or elongated plate-like conductor such as copper, brass, or aluminum. The parasitic antenna element 102 may be formed as a conductor pattern of a printed wiring board. Note that a resonance frequency of the parasitic antenna element 102 coincides with a resonance frequency of the feeding antenna element 101.

A length of the parasitic antenna element 102 (length of the vertical element section), is less than one half of a wavelength of a radio wave to be transmitted and received. In the first example embodiment, for example, when a frequency of the radio wave to be transmitted and received is 815 MHz, the length of the parasitic antenna element 102 (vertical element section) is one half or slightly shorter than the wavelength of the radio wave, for example, 135 mm.

Note that the length (height) of the parasitic antenna element 102 is not limited to the above-mentioned length because it depends on the wavelength of the target radio wave.

As illustrated in FIG. 3, the wireless communication device 200 includes a substrate 201 on which a ground layer 202 and a supply source 203 are formed, and the antenna device 100 illustrated in FIGS. 1 and 2.

The substrate 201 is a member on a flat plate composed of an electrically insulating material such as resin. Examples of the resin include a glass cloth material epoxy resin and the like.

The ground layer 202 is a plate-shaped conductor member composed of a conductor such as copper. Specifically, the ground layer 202 is a ground conductor of a mounting unit of an electric circuit such as a transmission/reception circuit or a signal processing circuit. The ground layer 202 is electrically connected to the feeding antenna element 101 via the supply source 203, and provides a reference potential (ground potential) to the feeding antenna element 101.

The supply source 203 functions as an input end of a high-frequency signal as a wireless communication signal to the feeding antenna element 101 and an output end of a high-frequency signal from the feeding antenna element 101. The supply source 203 includes, for example, two terminals, one terminal of which is connected to the feeding antenna element 101, and another terminal of which is connected to the ground layer 202.

Next, an operation of the antenna device 100 according to the first example embodiment will be explained with reference to FIG. 2. In FIG. 2, a current flowing through the ground layer 202 is indicated by a solid arrow, a current flowing through the feeding antenna element 101 is indicated by a broken arrow, and a current to be induced in the parasitic antenna element 102 is indicated by a dot-dash arrow. In the example illustrated in FIG. 2, in order to reduce a height of the antenna device 100, a first side of the ground layer 202, which is perpendicular to the ground surface, is shorter than a second side thereof, which is parallel to the ground surface. In addition, the current tends to flow in a portion having a length commensurate with the resonance frequency. Therefore, it is ideal that a total length of the feeding antenna element 101 and the first side of the ground layer 202 is approximately one half of the wavelength of the radio wave to be transmitted and received. However, in a case where the resonance frequency is about 815 MHz, the total length of the feeding antenna element 101 and the first side of the ground layer 202 is less than the length commensurate with the resonance frequency, and therefore, a larger amount of current flows in the second side longer than the first side. As a result, when the parasitic antenna element 102 is not used, an intensity of a horizontally polarized wave increases and an intensity of the vertically polarized wave decreases. However, in the antenna device 100 according to the first example embodiment, the intensity of the vertically polarized wave of the antenna device 100 can be increased by using the parasitic antenna element 102.

First, a high-frequency current flows from the ground layer 202 toward the feeding antenna element 101, and the high-frequency current is supplied to the feeding antenna element 101 via the supply source 203. Next, when the high-frequency current flows in the feeding antenna element 101, the high-frequency current is excited in the parasitic antenna element 102 by electromagnetic coupling action. At this time, the parasitic antenna element 102 resonates at a frequency of about one half of the wavelength of the radio wave to be transmitted and received. As a result, the parasitic antenna element 102 can increase the intensity of the vertically polarized wave of the antenna device 100. Note that strength of the high-frequency current excited by the parasitic antenna element 102 depends on strength of the high-frequency current flowing through the parasitic antenna element 101. Therefore, the resonance frequency of the parasitic antenna element 102 needs to coincide with the resonance frequency of the parasitic antenna element 101.

Figure 4:
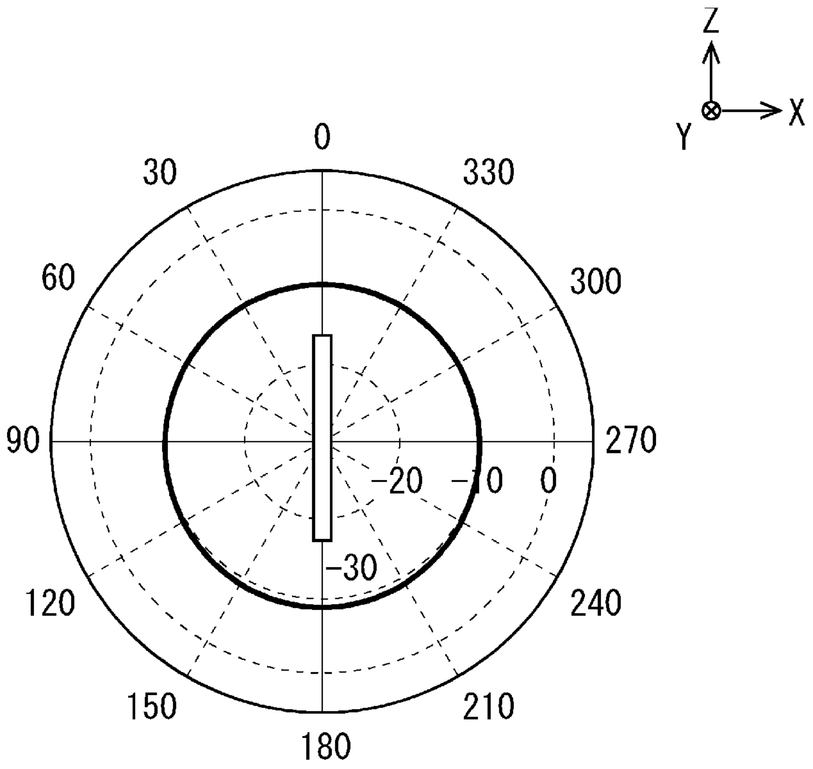
FIG. 4 is a graph illustrating an example of a measurement result of radiation characteristics of an antenna device without a parasitic antenna element according to the first example embodiment of the present invention.
Figure 5:
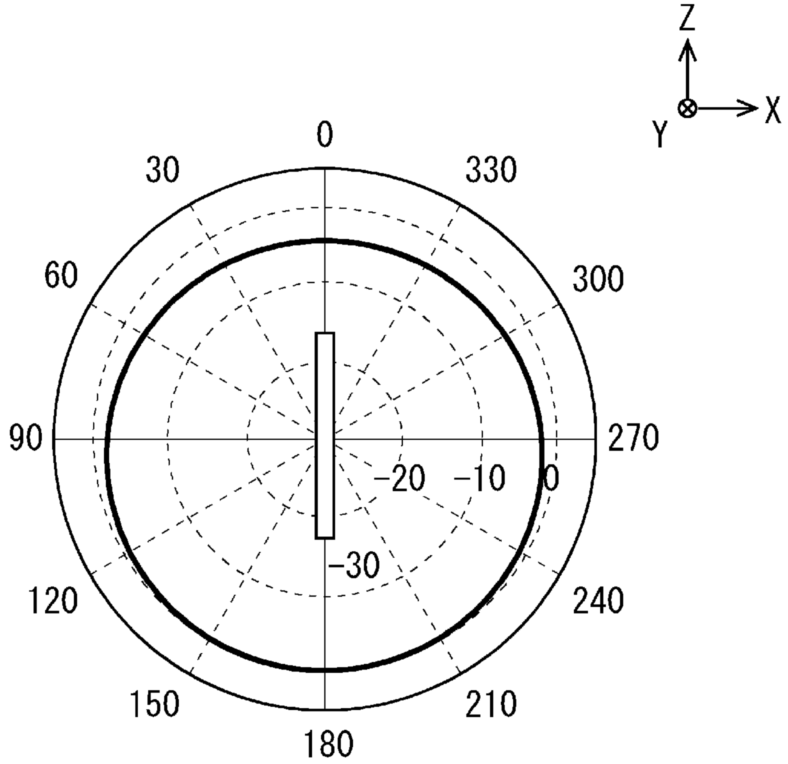
FIG. 5 is a graph illustrating an example of a measurement result of radiation characteristics of the antenna device according to the first example embodiment of the present invention.

Next, with reference to FIGS. 4 and 5, radiation characteristics of vertically polarized waves of the antenna device 100 according to the first example embodiment will be explained. FIGS. 4 and 5 illustrate measurement results of the radiation characteristics when the frequency of the radio wave to be transmitted and received is 815 MHz. FIG. 4 illustrates a measurement result of the radiation characteristics of an antenna device without the parasitic antenna element 102 according to the first example embodiment. FIG. 5 illustrates a measurement result of the radiation characteristics of the antenna device 100 according to the first example embodiment. Note that FIG. 5 is a measurement result using the parasitic antenna element 102 having a length of 135 mm. Comparing FIGS. 4 and 5, an antenna efficiency of the antenna device 100 including the parasitic antenna element 102 is −1.6 dB, while an antenna efficiency of the antenna device without the parasitic antenna element 102 is −3.4 dB. Therefore, it is understood that the intensity of the vertically polarized wave can be increased by providing the parasitic antenna element 102, and the antenna efficiency can be further improved.

According to the antenna device 100 and the wireless communication device 200 according to the first example embodiment described above, the parasitic antenna element 102 having a vertical element section disposed perpendicularly to the ground surface is provided in the vicinity of the end of the feeding antenna element 101, whereby the intensity of the vertically polarized wave can be increased. As a result, antenna efficiencies of the antenna device 100 and the wireless communication device 200 can be improved. In addition, the length of the parasitic antenna element 102 as a reflection element can be shortened to less than one half of the wavelength of the radio wave to be transmitted and received. This makes it possible to suppress enlargement of the antenna device 100 and the wireless communication device 200. Further, since the feeding antenna element 101 and the parasitic antenna element 102 are disposed at close positions, no additional noise countermeasure is required. Therefore, it is possible to provide an antenna device and a wireless communication device that are small in size and capable of transmitting and receiving a vertically polarized wave without requiring an additional noise countermeasure.

Second Example Embodiment

Figure 6:
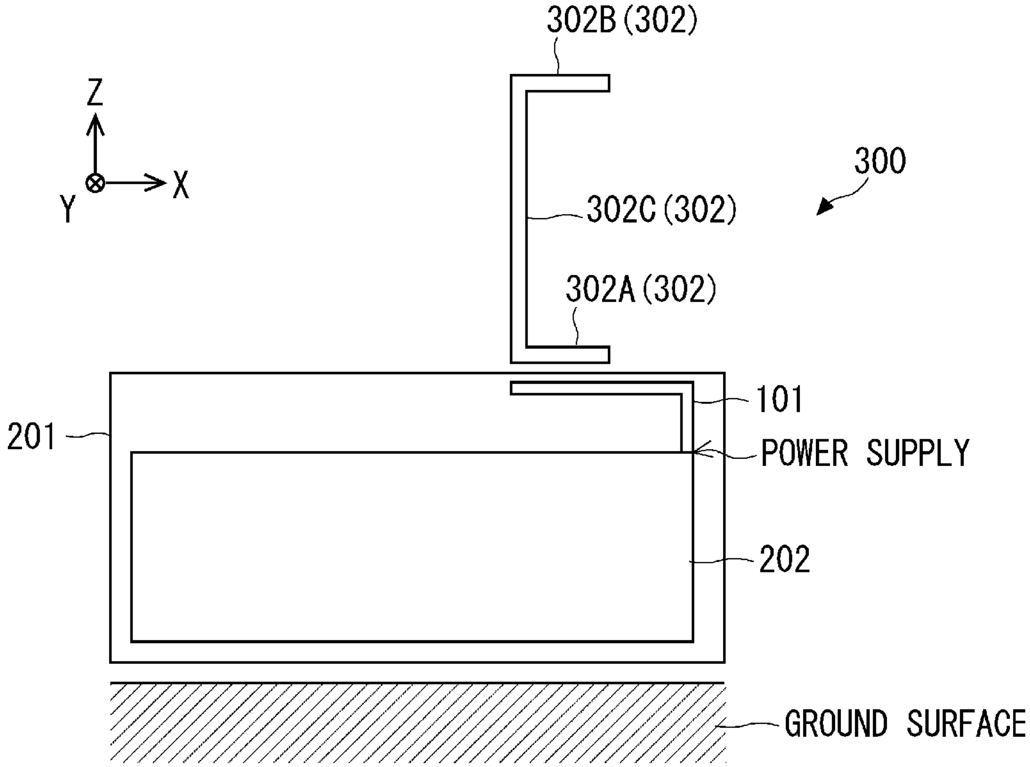
FIG. 6 is a front view illustrating an example of an antenna device according to a second example embodiment of the present invention.
Figure 7:
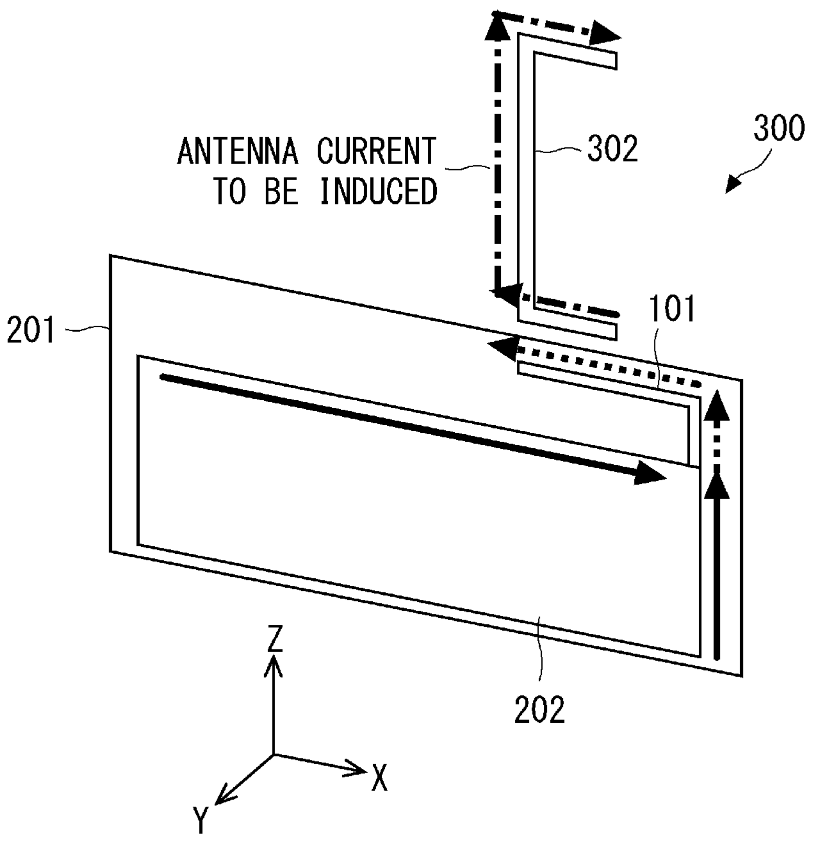
FIG. 7 is a perspective view illustrating an example of the antenna device according to the second example embodiment of the present invention.
Figure 8:
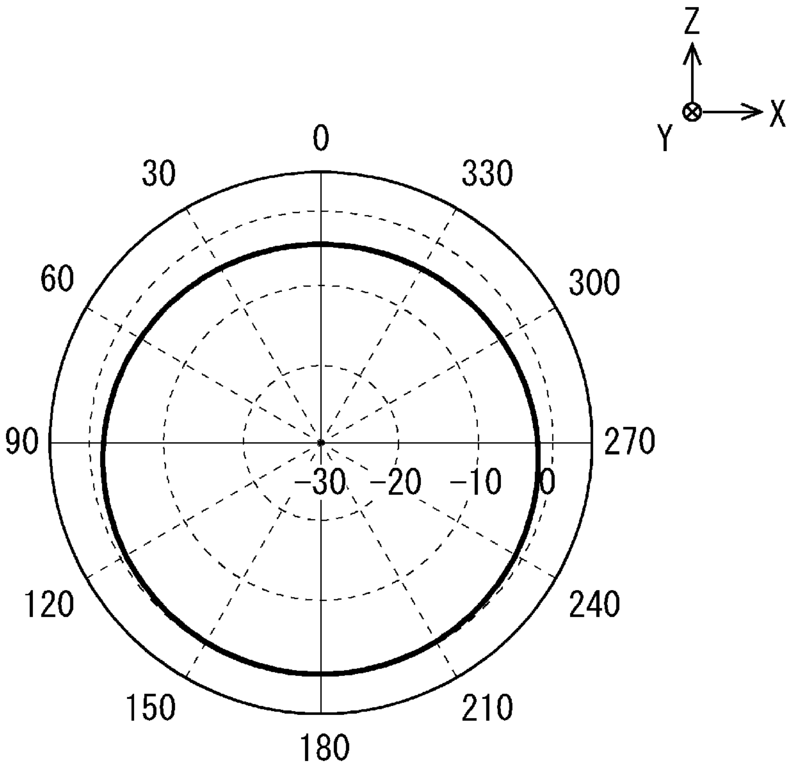
FIG. 8 is a graph illustrating an example of a measurement result of radiation characteristics of the antenna device according to the second example embodiment of the present invention.

Next, a second example embodiment of the present invention will be explained with reference to FIGS. 6 to 8. FIGS. 6 and 7 are diagrams each illustrating an example of an antenna device 300 according to the second example embodiment of the present invention. FIG. 8 illustrates a measurement result of radiation characteristics of the antenna device 300 according to the second example embodiment. Note that the second example embodiment is different from the first example embodiment only in a configuration of a parasitic antenna element 302 in the antenna device 300, and therefore, the same reference numerals are assigned to the same configurations as those of the first example embodiment in the second example embodiment, and descriptions thereof are omitted.

The parasitic antenna element 302 is a lying U-shaped element. Specifically, the parasitic antenna element 302 includes a first element section 302A, a second element section 302B, and a third element section 302C. The first element section 302A and the second element section 302B are two opposite sides of a lying U shape, and are disposed in parallel with an element section 101A, which is parallel to the ground surface, of the feeding antenna element 101. The first element section 302A is disposed on a closer side to a substrate 201 than the second element section 302B, and is disposed in such a way as to face the element section 101A of the feeding antenna element 101. The third element section 302C is a side connecting the two opposite sides of the lying U shape, and is a vertical element section of the parasitic antenna element 302. Namely, the first element section 302A and the second element section 302B are disposed in parallel with the X axis, and the third element section 302C is disposed in parallel with the Z axis. One end of the third element section 302C, which is a vertical element section, is disposed in the vicinity of another end of the feeding antenna element (an end on the side opposite to the feeding end). Specifically, the end of the third element section 302C on a side of the feeding antenna element 101 is disposed apart from an edge of the substrate 201 by a predetermined distance. The end of the third element section 302C is disposed in the vicinity of an end of the element section 101A of the feeding antenna element 101 on the side opposite to an end thereof connected to an element section 101B. Note that a distance between the end of the third element section 302C and the another end of the feeding antenna element 101 (end on the side opposite to the feeding end) is a distance at which a high-frequency current can be excited in the parasitic antenna element 302 by feeding the feeding antenna element 101.

The parasitic antenna element 302 is formed of a linear or elongated plate-like conductor such as copper, brass, or aluminum. The parasitic antenna element 302 may be formed as a conductor pattern of a printed wiring board. Note that a resonance frequency of the parasitic antenna element 302 coincides with a resonance frequency of the feeding antenna element 101.

In the first example embodiment, the length of the parasitic antenna element 102 is less than one half of the wavelength of the radio wave to be transmitted and received. However, since the parasitic antenna element 302 according to the second example embodiment has a lying U-shape, a length of the third element section 302C (vertical element section) may be shorter than the length of the parasitic antenna element 102. In the second example embodiment, for example, when a frequency of the radio wave to be transmitted and received is 815 MHz, the length of the third element section 302C (vertical element section) is, for example, 90 mm. Note that the length (height) of the third element section 302C is not limited to the above length because it depends on the wavelength of the target radio wave.

FIG. 7 illustrates an operation of the antenna device 300 according to the second example embodiment. In FIG. 7, a current flowing through the ground layer 202 is indicated by a solid arrow, a current flowing through the feeding antenna element 101 is indicated by a broken arrow, and a current to be induced in the parasitic antenna element 302 is indicated by a dot-dash arrow. As illustrated in FIG. 7, the operation of the antenna device 300 according to the second example embodiment is the same as that of the antenna device 100 according to the first example embodiment illustrated in FIG. 2, and therefore, the description thereof is omitted.

Next, with reference to FIG. 8, a radiation characteristic of a vertically polarized wave of the antenna device 300 according to the second example embodiment will be explained. Note that FIG. 8 is a measurement result using a parasitic antenna element 302 having a length of 90 mm in the third element section 302C, which is a vertical element section. Furthermore, FIG. 8 illustrates the measurement result of the radiation characteristic when the frequency of the radio wave to be transmitted and received is 815 MHz. Comparing FIGS. 5 and 8, the antenna efficiency of the antenna device 100 according to the first example embodiment is −1.6 dB, whereas an antenna efficiency of the antenna device 300 according to the second example embodiment is −1.5 dB. Therefore, it is understood that also in the antenna device 300 according to the second example embodiment, an intensity of the vertically polarized wave can be increased and the antenna efficiency can be further improved, similarly to the antenna device 100 according to the first example embodiment.

According to the antenna device 300 and a wireless communication device 200 according to the second example embodiment, which have been explained above, not only an effect equivalent to that of the antenna device 100 according to the first example embodiment can be acquired, but also a height of the parasitic antenna element 302 of the antenna device 300 can be further reduced because the parasitic antenna element 302 has a lying U-shape. This makes it possible to further reduce heights of the antenna device 300 and the wireless communication device 200.

Third Example Embodiment

Figure 9:
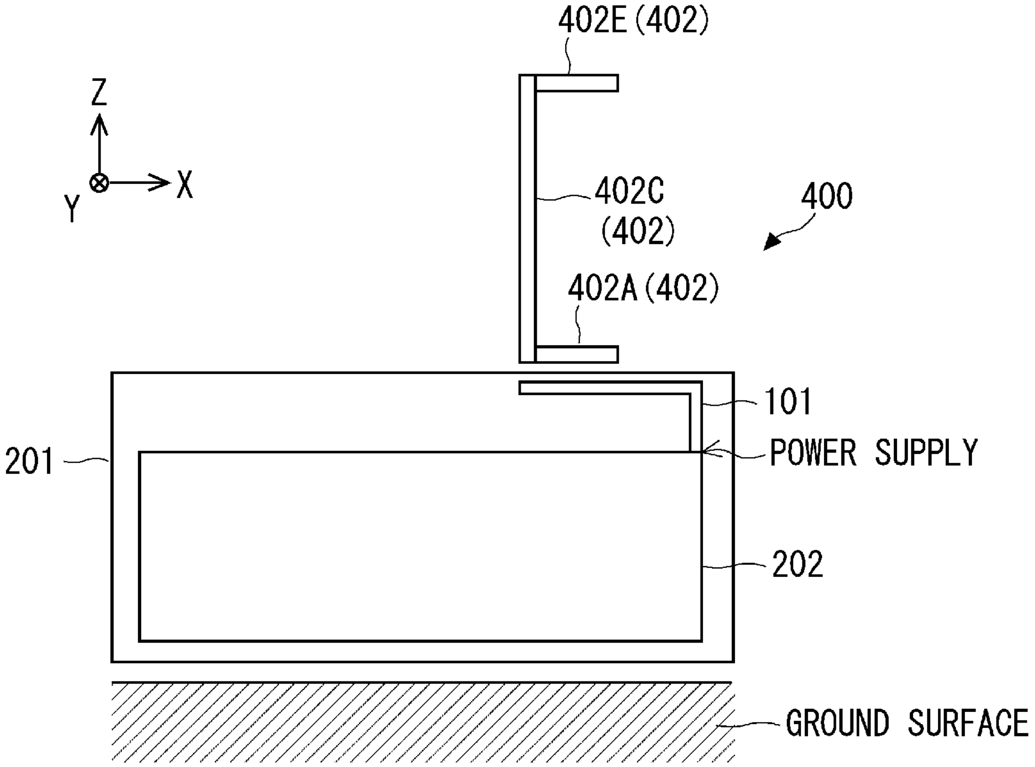
FIG. 9 is a front view illustrating an example of an antenna device according to a third example embodiment of the present invention.
Figure 10:
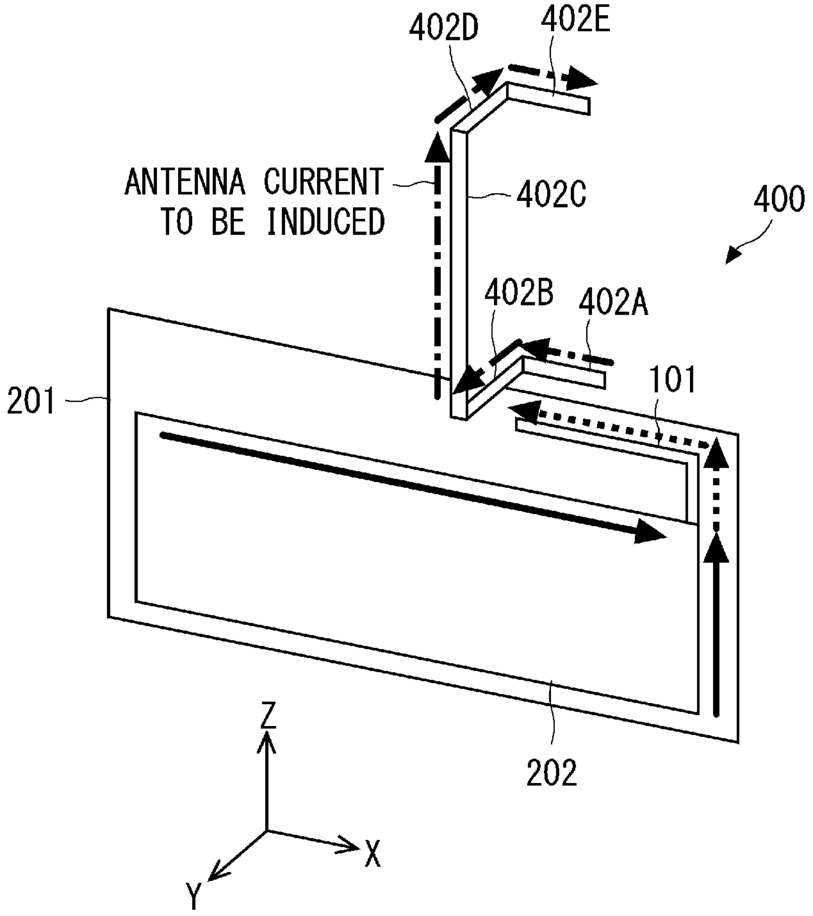
FIG. 10 is a perspective view illustrating an example of the antenna device according to the third example embodiment of the present invention.
Figure 11:
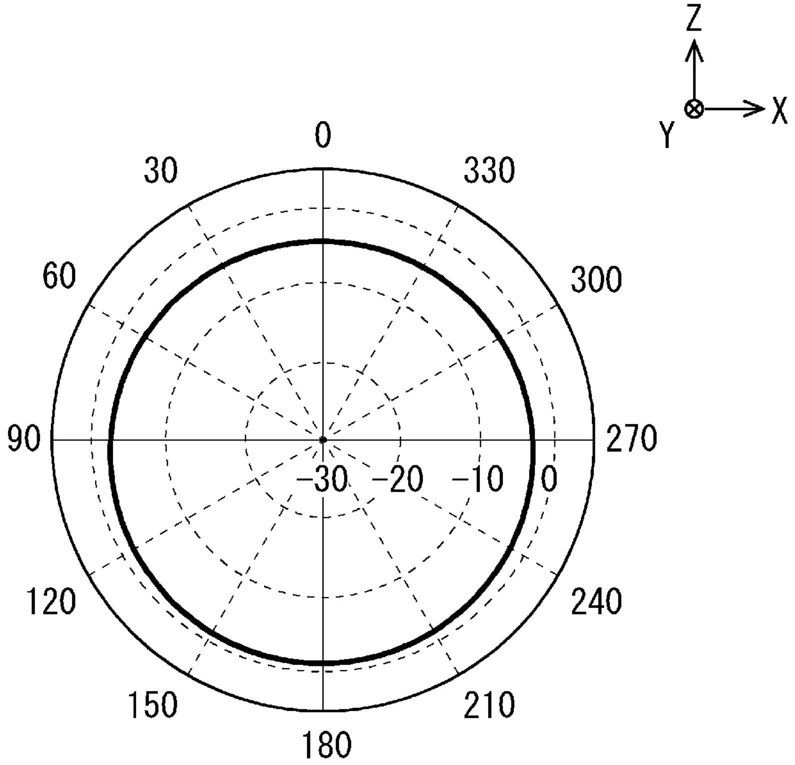
FIG. 11 is a graph illustrating an example of a measurement result of radiation characteristics of the antenna device according to the third example embodiment of the present invention.

Next, a third example embodiment of the present invention will be explained with reference to FIGS. 9 to 11. FIGS. 9 and 10 are diagrams each illustrating an example of an antenna device 400 according to the third example embodiment of the present invention. FIG. 11 illustrates a measurement result of radiation characteristics of the antenna device 400 according to the third example embodiment. Note that the third example embodiment is different from the first example embodiment only in a configuration of a parasitic antenna element 402 in the antenna device 400, and therefore, the same reference numerals are assigned to the same configurations as those of the first example embodiment in the third example embodiment, and descriptions thereof are omitted.

The parasitic antenna element 402 includes not only components parallel to the X-axis and the Z-axis but also a component parallel to the Y-axis. In other words, the parasitic antenna element 402 has a three-dimensional shape. Specifically, the parasitic antenna element 402 includes a first element section 402A, a second element section 402B, a third element section 402C, a fourth element section 402D, and a fifth element section 402E. The first element section 402A, the second element section 402B, the third element section 402C, the fourth element section 402D, and the fifth element section 402E are electrically connected in this order. In addition, the first element section 402A, the second element section 402B, the third element section 402C, the fourth element section 402D, and the fifth element section 402E are connected at ends thereof to each other in such a way that angles formed by the ends are at right angle to each other. The first element section 402A, the second element section 402B, the fourth element section 402D, and the fifth element section 402E are parallel element sections disposed in parallel with a ground surface. The third element section 402C is a vertical element section disposed perpendicularly to the ground surface. The first element section 402A is disposed at a position facing an element section 101A of a feeding antenna element 101, and is disposed in the vicinity of the feeding antenna element 101. The second element section 402B and the fourth element section 402D are connected to ends of the third element section 402C, which is a vertical element section, in such a way that an angle formed by the third element section 402C is at right angle.

More specifically, the first element section 402A and the fifth element section 402E are disposed in parallel with the X-axis. The second element section 402B and the fourth element section 402D are disposed in parallel with the Y-axis. The third element section 402C is disposed in parallel with the Z-axis. The first element section 402A and the fifth element section 402E are opposed to each other, and the second element section 402B and the fourth element section 402D are opposed to each other. The first element section 402A and the second element section 402B are disposed on a side closer to the substrate 201 than the fourth element section 402D and the fifth element section 402E. The first element section 402A and the fifth element section 402E are disposed at substantially the same position as the substrate 201 in a Y-axis direction. The first element section 402A is disposed in such a way as to face the element section 101A of the feeding antenna element 101. The second element section 402B is connected to an end of the first element section 402A, which faces another end of the feeding antenna element 101 (an end on the side opposite to an feeding end). The third element section 402C is connected to an end of the second element section 402B on the side opposite to the end connected to the first element section 402A, and extends in a direction away from the substrate 201 in parallel with the Z axis. The fourth element section 402D is connected to an end of the third element section 402C on the side opposite to an end thereof on the substrate 201 side. The fifth element unit 402E is connected to an end of the fourth element unit 402D on the side opposite to the end thereof connected to the third element unit 402C. In addition, the second element section 402B extends from the end of the first element section 402A in a direction protruding toward a surface side of the substrate 201 on which the ground layer 202, the supply source 203, the feeding antenna element 101, and the like are provided. Hereinafter, a surface of the substrate 201 on which the ground layer 202, the supply source 203, and the feeding antenna element 101 are provided is referred to as a surface of the substrate 201. Similarly, the fourth element section 402D extends from the end of the fifth element section 402E in a direction protruding toward the surface side of the substrate 201. Namely, the second element section 402B, the third element section 402C, and the fourth element section 402D are disposed at positions away from the surface of the substrate 201 in the Y-axis direction.

The first element section 402A is disposed apart from an edge of the substrate 201 by a predetermined distance. The first element section 402A is disposed in the vicinity of the element section 101A of the feeding antenna element 101 in such a way as to face the element section 101A. Note that a distance between the first element section 402A and the element section 101A of the feeding antenna element 101 is a distance at which a high-frequency current can be excited in the parasitic antenna element 402 by feeding the feeding antenna element 101.

The parasitic antenna element 402 is formed of a linear or an elongated plate-like conductor such as copper, brass, or aluminum. Note that a resonance frequency of the parasitic antenna element 402 coincides with a resonance frequency of the feeding antenna element 101.

In the first example embodiment, a length of the parasitic antenna element 102 is less than one half of a wavelength of a radio wave to be transmitted and received. However, since the parasitic antenna element 402 according to the third example embodiment has a three-dimensional shape in which a plurality of element sections are connected, a length of the third element section 402C (vertical element section) is shorter than the length of the parasitic antenna element 102. In the third example embodiment, for example, when a frequency of the radio wave to be transmitted and received is 815 MHz, the length of the third element section 402C (vertical element section) is, for example, 50 mm. Note that the length (height) of the third element section 402C is not limited to the above length because it depends on the wavelength of the target radio wave.

FIG. 10 illustrates an operation of the antenna device 400 according to the third example embodiment. In FIG. 10, a current flowing through the ground layer 202 is indicated by a solid arrow, a current flowing through the feeding antenna element 101 is indicated by a broken arrow, and a current induced in the parasitic antenna element 402 is indicated by a dot-dash arrow. As illustrated in FIG. 10, the operation of the antenna device 400 according to the third example embodiment is the same as that of the antenna device 100 according to the first example embodiment illustrated in FIG. 2, and therefore the description thereof is omitted.

Next, with reference to FIG. 11, a radiation characteristic of a vertically polarized wave of the antenna device 400 according to the third example embodiment will be explained. Note that FIG. 11 is a measurement result using the parasitic antenna element 402 having a length of the third element section 402C which is a vertical element section, of 50 mm. Furthermore, FIG. 11 illustrates the measurement result of the radiation characteristic when the frequency of the radio wave to be transmitted and received is 815 MHz. Comparing FIGS. 5 and 11, the antenna efficiency of the antenna device 100 according to the first example embodiment is −1.6 dB, whereas an antenna efficiency of the antenna device 400 according to the third example embodiment is −2.9 dB. Therefore, it can be seen that in the antenna device 400 according to the third example embodiment as well, an intensity of the vertically polarized wave can be increased and the antenna efficiency can be further improved, similarly to the antenna device 100 according to the first example embodiment.

According to the antenna device 400 and the wireless communication device 200 according to the third example embodiment that have been explained above, not only an effect equivalent to that of the antenna device 100 according to the first example embodiment can be achieved, but also a height of the parasitic antenna element 402 of the antenna device 400 can be further reduced because the parasitic antenna element 402 has a three-dimensional shape. This makes it possible to further reduce heights of the antenna device 400 and the wireless communication device 200.

Although the present invention has been explained above with reference to the example embodiments, the present invention is not limited to the above. Various modifications can be made to the structure and details of the present invention which can be understood by a person skilled in the art within the scope of the invention.

This application claims priority to Japanese Patent Application No. 2020-075850, filed on Apr. 22, 2020, the entire disclosure of which is incorporated herein by reference.

INDUSTRIAL APPLICABILITY

It is possible to provide an antenna device and a wireless communication device that are small in size and capable of transmitting and receiving vertically polarized waves without requiring an additional noise countermeasure.

REFERENCE SIGNS LIST

100,300,400 ANTENNA DEVICE
101 FEEDING ANTENNA ELEMENT
101A, 101B ELEMENT SECTION
102 PARASITIC ANTENNA ELEMENT (VERTICAL ELEMENT SECTION)
302, 402 PARASITIC ANTENNA ELEMENT
302A FIRST ELEMENT SECTION
302B SECOND ELEMENT SECTION
302C THIRD ELEMENT SECTION (VERTICAL ELEMENT SECTION)
402A FIRST ELEMENT SECTION (PARALLEL ELEMENT SECTION)
402B SECOND ELEMENT SECTION (PARALLEL ELEMENT SECTION)
402C THIRD ELEMENT SECTION (VERTICAL ELEMENT SECTION)
402D FOURTH ELEMENT SECTION (PARALLEL ELEMENT SECTION)
402E FIFTH ELEMENT SECTION (PARALLEL ELEMENT SECTION)
200 WIRELESS COMMUNICATION DEVICE
201 SUBSTRATE
202 GROUND LAYER
203 SUPPLY SOURCE

The invention claimed is:

1. An antenna device comprising:

a feeding antenna element configured to be electrically connected at one end to a supply source configured to supply a wireless communication signal, the feeding antenna element including an element section parallel to a ground surface; and a parasitic antenna element including a vertical element section disposed perpendicularly to the ground surface, the parasitic antenna element being disposed apart from another end of the feeding antenna element by a predetermined distance, wherein the parasitic antenna element includes two parallel element parts disposed in parallel with the ground surface, wherein each of the two parallel element parts includes a plurality of parallel element sections, the plurality of parallel element sections are connected to each other at ends thereof in such a way that at least two of the parallel element sections form a right angle, each of the two parallel element parts is connected to each end of the vertical element section in such a way that each angle formed with the vertical element section is at right angle, respectively, and one of the plurality of parallel element sections of one of the two parallel element parts is disposed parallel to the element section parallel to the ground surface of the feeding antenna element at a position facing the feeding antenna element and is disposed apart from the feeding antenna element by the predetermined distance.

2. A wireless communication device comprising:

a substrate on which a ground layer having a reference potential and a supply source supplying a wireless communication signal are formed; and the antenna device according to claim 1.

* * * * *